Nov. 3, 1931.  F. H. KNEELAND  1,829,866
BLASTING CARTRIDGE
Filed Oct. 28, 1929
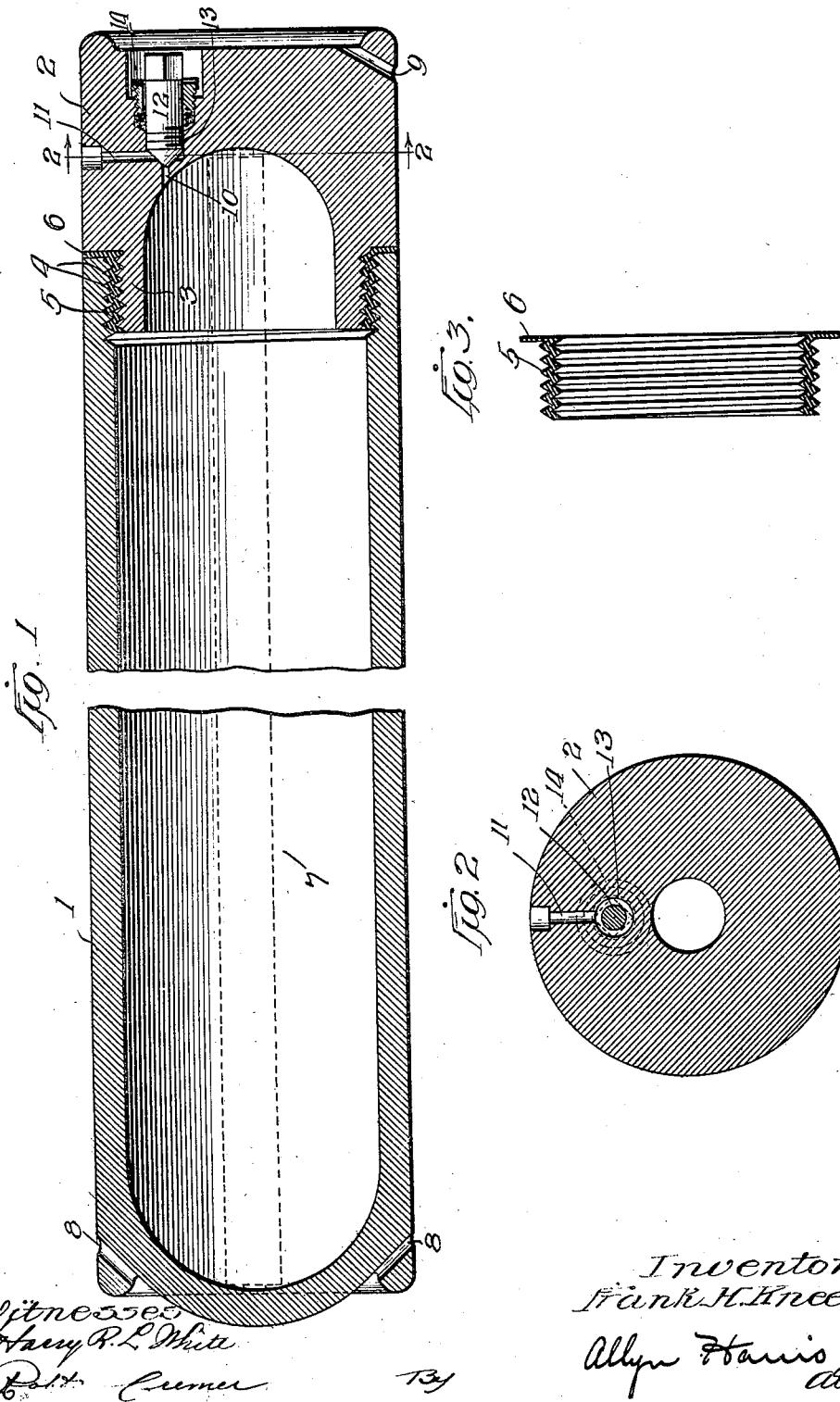
Inventor:
Frank H. Kneeland Patented Nov. 3, 1931

1,829,866

UNITED STATES PATENT OFFICE

FRANK H. KNEELAND, OF CHICAGO, ILLINOIS, ASSIGNOR TO SAFETY MINING COMPANY, OF CHICAGO, ILLINOIS, A CORPORATION

BLASTING CARTRIDGE

Application filed October 28, 1929. Serial No. 403,009.

This invention relates to blasting cartridges of the type wherein the blasting medium is a gas, the pressure of which is increased to the blasting point by means of an electrical device located within the cartridge, and embodying means for releasing the gas when such point is reached.

The principal object of the invention is to simplify blasting cartridges of the type indicated.

Other objects and advantages of the simplified structure, illustrated in the accompanying drawings will be pointed out in the following description.

Figure 1 is a longitudinal sectional view of a complete cartridge constructed according to the present invention.

Figure 2 is a transverse section along line 2—2 of Figure 1.

Figure 3 is a detail view in section of the rupturable insulating member.

The simplified cartridge according to the present invention comprises two main body portions, 1 and 2 respectively. The member 1 is in the form of an elongated open ended cylinder and the member 2 is of similar construction, although preferably shorter than member 1. The member 1 is of uniform diameter, both internally and externally throughout its length. The open end of member 2 is substantially reduced in diameter as indicated at 3 and this reduced portion is designed to be inserted in telescopic relation within the end of the member 1. The telescoping portions of members 1 and 2 are provided with opposed screw threads as indicated at 4. It will be noted, however, that these threads are not in direct engagement and that the external diameter of the threads on the member 3 is slightly less than the internal diameter of the threads formed in the member 1. These opposed threads are joined by means of an intermediate connector member 5 which conforms to the contour of the threads formed in the two members. This connector member 5 is preferably formed of a relatively strong fibre or other insulating material. It will also be noted that the connector member 5 is provided with a radial flange 6 which extends between the adjacent faces of the members 1 and 2, thus completely insulating these members one from the other.

In cartridges of this character it is customary to increase the pressure of the gaseous charge by means of an electrically energizable heater unit such as herein indicated at 7. This heater unit is provided with electrical contacts at its opposite ends which have engagement with the end walls of the members 1 and 2 respectively. Thus, the heater unit 7 may be connected in circuit with a source of electricity by merely connecting the leads of such a source to the portions 1 and 2 of the cartridge. Apertures 8 and 9 are provided in the members 1 and 2 respectively to facilitate the making of these electrical connections.

In order to introduce a charge of compressed or liquefied gas into the cartridge there is provided a pair of communicating charging ports 10 and 11, the former of which is controlled by means of a valve 12 having threaded engagement with the body portion 2 of the cartridge as indicated at 13. The valve is surrounded by a suitable packing and packing gland 14.

The insulating connecting member 5 is so designed as to size and strength of material that it will rupture and permit axial separation of the body members 1 and 2 upon the attainment of a substantially predetermined pressure within the gas chamber formed in these members. It will be understood, of course, that the rupture point of the connector member 5 may be varied by employing connector members of different lengths and materials.

The blasting cartridge hereinabove described is extremely simple by reason of the fact that the single connector member 5 replaces the usual insulated electrode and the usual rupturable disc or other form of independent pressure responsive venting device. The cartridge comprises but two major parts, and embodies only the simple valve unit as an accessory. It will be understood that the relative capacities of the chambers formed in the members 1 and 2 may be varied as desired. For instance, these members may be made of equal length or the member 2 may be utilized primarily as a cap for the open end of the member 1. In either case, one of the main members such as the member 1 in the present instance, may be made of varying capacities for association with cap members 2 of constant capacity whereby to provide the necessary range of cartridge capacities for the variety of conditions encountered in the field.

I claim:

1. A blasting cartridge comprising two main body parts and a pressure responsive rupturable insulating coupling for joining said parts.

2. A blasting cartridge comprising two metallic cylinders, each closed at one end and open at the other, a rupturable insulating coupling member joining the adjacent open ends of said cylinders, and a valve in one of said cylinders.

3. A blasting cartridge comprising two main body parts which cooperate to form a gas chamber, a valve in one of the said parts for introducing gas into the chamber, a coupling member joining said parts, said coupling member being rupturable in response to a predetermined pressure to permit separation of said parts and release the gas, and said coupling member being formed of the insulating material, whereby to insulate body parts one from the other, and an electrical device disposed within said cartridge and having electrical connection with the respective body parts.

Signed at Chicago, Illinois, this 18th day of October 1929.

FRANK H. KNEELAND.